(12) United States Patent
Loebel et al.

(10) Patent No.: US 8,026,361 B2
(45) Date of Patent: Sep. 27, 2011

(54) ISOINDOLINE PIGMENTS

(75) Inventors: Johannes Loebel, Mannheim (DE); Andreas Stohr, Freinsheim (DE); Peter Boettcher, Carlsberg (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 271 days.

(21) Appl. No.: 12/373,639

(22) PCT Filed: Jul. 11, 2007

(86) PCT No.: PCT/EP2007/057078
§ 371 (c)(1),
(2), (4) Date: Jan. 13, 2009

(87) PCT Pub. No.: WO2008/009597
PCT Pub. Date: Jan. 24, 2008

(65) Prior Publication Data
US 2010/0003612 A1    Jan. 7, 2010

(30) Foreign Application Priority Data

Jul. 18, 2006    (EP) .................................... 06117360

(51) Int. Cl.
*C09B 57/04* (2006.01)
*C09B 67/10* (2006.01)
(52) U.S. Cl. ...................... 544/300; 106/31.6
(58) Field of Classification Search .................. 544/300; 106/31.6
See application file for complete search history.

(56) References Cited

U.S. PATENT DOCUMENTS

| | | | |
|---|---|---|---|
| 3,646,033 A | 2/1972 | Leister et al. | |
| 3,794,659 A | 2/1974 | Leister et al. | |
| 4,271,301 A | 6/1981 | Lotsch et al. | |
| 4,316,023 A | 2/1982 | Henning et al. | |
| 4,371,735 A | 2/1983 | Scherer et al. | |
| 4,398,027 A | 8/1983 | Lotsch et al. | |
| 4,451,654 A | 5/1984 | Graser et al. | |
| 4,758,663 A | 7/1988 | Scherer et al. | |
| 2006/0150866 A1 | 7/2006 | Stohr et al. | |

FOREIGN PATENT DOCUMENTS

| | | |
|---|---|---|
| CA | 1 140 130 | 1/1983 |
| DE | 1 670 748 | 5/1973 |
| DE | 27 57 982 B1 | 6/1979 |
| DE | 28 00 815 A1 | 7/1979 |
| DE | 29 14 086 B1 | 9/1980 |
| EP | 0 017 214 A1 | 10/1980 |
| EP | 0 029 007 A1 | 5/1981 |
| EP | 0 036 523 A2 | 9/1981 |
| WO | WO 2004/108837 A1 | 12/2004 |

*Primary Examiner* — Deepak Rao
(74) *Attorney, Agent, or Firm* — Oblon, Spivak, McClelland, Maier & Neustadt, L.L.P.

(57) ABSTRACT

Isoindoline pigments of the general formula I

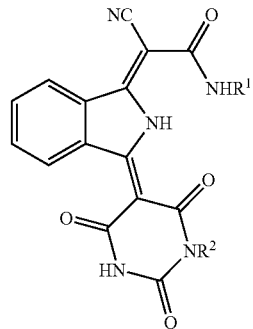

in which the variables are defined as follows:
$R^1$ is $C_1$-$C_4$-alkyl;
$R^2$ is hydrogen or $C_1$-$C_4$-alkyl,
whose value expressing ease of dispersion in LDPE is $\leq 10$ and which require a reduction ratio of $\geq 5$ to obtain ⅓ of standard depth of shade.

9 Claims, No Drawings

ISOINDOLINE PIGMENTS

This application is a 371 of PCT/EP07/57078 filed Jul. 11, 2007.

The present description relates to isoindoline pigments of the general formula I

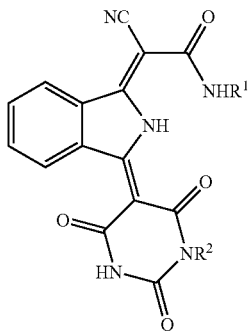

in which the variables are defined as follows:
$R^1$ is $C_1$-$C_4$-alkyl;
$R^2$ is hydrogen or $C_1$-$C_4$-alkyl,
whose value expressing ease of dispersion in LDPE is ≦10 and which require a reduction ratio of ≧5 to obtain ⅓ of standard depth of shade.

The invention further relates to the preparation of the isoindoline pigments and to their use for the coloring of high-molecular-weight organic materials of natural and synthetic origin, and also to plastics colored with the isoindoline pigments.

The usual materials used for the yellow coloring of plastics, coatings, and printing inks are inorganic pigments, e.g. C.I. Pigment Yellow 34 or 184, or organic pigments, e.g. quinophthalone pigments, such as C.I. Pigment Yellow 138, isoindoline pigments, such as C.I. Pigment Yellow 139, or azo pigments, such as C.I. Pigment Yellow 74, 151, or 180. The demand for colorants, in particular pigments, free from heavy metals and from halogens has risen sharply in recent times for reasons related to the environment.

The level of interest in isoindoline pigments, in particular C.I. Pigment Yellow 185, which has now been known for about 30 years, is therefore increasing. However, powder pigments based on C.I. Pigment Yellow 185, which have been available in the market for about 25 years, can be used only as pigments for printing inks and for coatings. Their performance in the ease-of-dispersion test makes them unsuitable for direct use in plastics, and instead they first have to be converted into preparations in a complicated manner.

Nor do the preparation processes described in the patent literature give C.I. Pigment Yellow 185 having the properties required for direct use in plastics.

For example, DE-A-29 14 086 describes the preparation of the isoindoline pigments of the present formula I in an aqueous medium by, in a first step, converting di-iminoisoindoline (II)

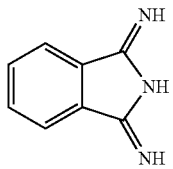

via condensation with a cyanoacetamide of the formula III

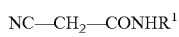

in an alkaline aqueous medium at from 25 to 90° C. to a semicondensate of the formula IV

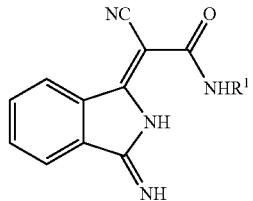

which, without intermediate isolation, after acidification of the reaction mixture and at temperatures of from 70 to 90° C., is reacted with a barbituric acid of the formula V

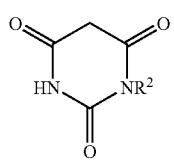

to give the isoindoline pigment I.

The isoindoline pigment I is then isolated after from 2 to 3 hours of continued stirring of the reaction mixture at from 90 to 95° C. The isoindoline pigment I thus obtained has good color strength, but cannot be used directly in plastics because it gives a value of about 50 in the ease-of-dispersion test.

DE-A-27 57 982 uses this one-pot process to prepare isoindoline pigments having a carbonamido group or (p-chloro) phenylcarbonamido group (radical $R^1$: hydrogen or (p-chloro)phenyl). The resultant isoindoline pigments are described as readily dispersible in plastics. In order to increase their lightfastness and weather resistance, thermal after-treatment of the aqueous reaction mixture at from 110 to 140° C. is recommended.

According to the procedure described in EP-A-29 007, the isoindoline pigments of the present formula I are prepared, as is also disclosed in DE-A-16 70 748, in two stages via a first condensation to give the semicondensate IV in methanol, intermediate isolation, and further reaction in dilute acetic acid. In order to prepare coarser forms of pigment with greater hiding power, a subsequent heat treatment of the reaction mixture is also proposed. However, if this conversion process is, as described in the examples, undertaken via heating of the crude pigment for 3 hours in aqueous acetic acid to 120° C., the result is a C.I. Pigment Yellow 185 having very little color strength.

An object underlying the invention was therefore to provide isoindoline pigments which feature overall advantageous performance characteristics and also in particular are readily dispersible in plastics.

The isoindoline pigments of the general formula I

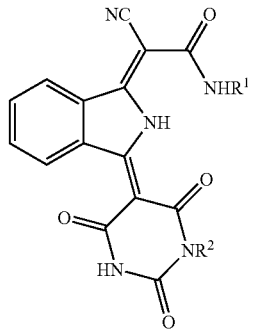

have accordingly been found, in which the variables are defined as follows:

$R^1$ is $C_1$-$C_4$-alkyl;
$R^2$ is hydrogen or $C_1$-$C_4$-alkyl, whose value expressing ease of dispersion in LDPE is $\leq 10$ and which require a reduction ratio of $\geq 5$ to obtain ⅓ of standard depth of shade.

Furthermore, a process for the preparation of the isoindoline pigments I has been found, which comprises subjecting the crude pigment produced during pigment synthesis to a crystallization process in the presence of an agent which merely solvates the pigment particles.

Finally, the use of the isoindoline pigments I for the coloring of high-molecular-weight organic materials of natural and synthetic origin has been found.

The inventive isoindoline pigments I feature excellent performance characteristics. C.I. Pigment Yellow 185 ($R^1$: methyl, $R^2$: hydrogen) is of particular importance here.

The inventive isoindoline pigments I have very good dispersibility in a very wide variety of usage media, among which are particularly plastics, and their value expressing ease of dispersion in LDPE is $\leq 10$ (determined by a method based on DIN EN 13900).

At the same time, they have excellent color properties, and especially high color strength. According to the invention, the color strength is defined via the reduction ratio required to obtain ⅓ of standard depth of shade ST (DIN 53235-1). The reduction ratio in LDPE is therefore $\geq 5$, preferably $\geq 5.5$, and in PVC is $\geq 9$, preferably $\geq 10.5$.

The average primary particle size of the inventive isoindoline pigments I is generally from 50 to 180 nm.

The BET surface area of the inventive isoindoline pigments I is usually from 25 to 40 m$^2$/g.

The inventive isoindoline pigments I can comprise subordinate amounts of unreacted semicondensate IV and of hydrolyzed semicondensate (hydrolysis of the imine function to give the carbonyl group). The total amount of these ancillary components is generally below 20% by weight, in particular below 15% by weight.

The inventive isoindoline pigments I are advantageously obtainable by the, likewise inventive, preparation process in which the crude pigment produced during pigment synthesis is subjected to a crystallization process in the presence of an agent which merely solvates the pigment particles.

The crude pigment here can be synthesized by the known processes with intermediate isolation of the semicondensate IV (variant A) or by a one-pot synthesis (variant B), preference being given to variant B.

In variant A, organic solvents are used as reaction medium. Suitable solvents for the first condensation step are either protic solvents, in particular aliphatic alcohols, such as methanol, ethanol, isopropanol, isobutanol, amyl alcohol, ethylene glycol, and ethylene glycol monoethyl ether, or else aprotic solvents, such as dimethylformamide, dimethylacetamide, N-methylpyrrolidone, acetonitrile, dimethyl sulfoxide, dioxane, sulfolan, dichlorobenzene, and nitrobenzene, preference being given to the alcoholic solvents. The second condensation step preferably takes place in aliphatic carboxylic acids, such as formic acid, acetic acid, propionic acid, and mono- and dichloroacetic acid. The reaction temperature is usually from 40 to 120° C. in the first stage and from 60 to 180° C. in the second stage.

In variant B, operations are carried out in an aqueous medium, preferably in water or else in mixtures of water and ethylene glycol. If desired, it is also possible to add surfactants. The first condensation step is generally carried out at from 10 to 180° C., in particular at from 10 to 90° C., and at a pH >7, in particular from 8 to 11. The further reaction of the semicondensate is usually undertaken at from 40 to 150° C., especially at from 40 to 100° C., and at a pH <7, in particular from 1 to 3. The pH is usually adjusted via addition of ammonia, preferably of concentrated aqueous ammonia solutions, and, respectively, of inorganic acids, preferably in dilute form, preference being given to sulfuric acid, phosphoric acid, and hydrochloric acid.

Preparation of the crude pigment by variant B is particularly advantageous when the inventive crystallization process is undertaken via heat treatment of the crude pigment in aqueous suspension.

In this preferred variant of the process, the crystallization can take place without intermediate isolation of the crude pigment directly in the suspension produced during synthesis.

If exceptionally high demands are placed on the isoindoline pigments I with respect to purity, the crude pigment can also be isolated and, if appropriate, purified, and can also then be dried and comminuted.

In the inventive crystallization process in aqueous suspension, the crude pigment is heated for from 1 to 60 h to a temperature T in the range from 90 to 180° C. The temperature T[° C.] here depends on the treatment time t[h] and is to be calculated from the following formula:

$$T[°C.]=[148-14.4\ln(t)]\pm10$$

By way of example, some treatment times t[h] are given below opposite the temperatures T[° C.] to be selected correspondingly:

| Treatment time t [h] | Treatment temperature T[° C.] |
|---|---|
| 2 | 138 ± 10 |
| 3 | 132 ± 10 |
| 12 | 112 ± 10 |
| 36 | 96 ± 10 |

The inventive crystallization process is generally carried out in a medium which is neutral or which is acidic, the latter being particularly applicable if the reaction suspension produced during the synthesis is used, its pH by this stage being below 7.

Acetic acid is unsuitable here for adjustment of the pH. Organic acids are generally less suitable than inorganic acids, preferred inorganic acids being sulfuric acid, phosphoric acid and hydrochloric acid.

The ratio by weight of aqueous medium to crude pigment is generally from 5:1 to 50:1, in particular from 10:1 to 40:1.

Organic solvents can also be added to the aqueous suspension.

The result here can be deviations from the temperatures and, respectively, treatment times calculated from the formula above. In rare cases, the treatment time required can become longer, but it will generally become shorter, the values extending downward to one third of the calculated time.

Examples of suitable solvents are alcohols, ether alcohols, ethers, ketones, carboxamides, and carboxylic esters, and mixtures of these. By way of example, specific mention may be made of the following compounds:
aliphatic and aralphatic, monohydric or polyhydric alcohols having up to 10 carbon atoms, e.g. methanol, ethanol, propanol, isopropanol, butanol, isobutanol, tert-butanol, amyl alcohol, isoamyl alcohol, hexanol, isohexanol, heptanol, octanol, 2-ethylhexanol, ethylene glycol, propylene 1,2- and 1,3-glycol, cyclohexanol, methylcyclohexanol, benzyl alcohol, and 2-phenylethanol;

mono- and di-$C_2$-$C_3$-alkylene glycol mono-$C_1$-$C_4$-alkyl ethers, such as ethylene glycol monomethyl, monoethyl, and monobutyl ether, and diethylene glycol monomethyl and monoethyl ether;

acyclic and cyclic aliphatic ethers having up to 10 carbon atoms, e.g. dipropyl ether, diisopropyl ether, dibutyl ether, diisobutyl ether, tetrahydrofuran, dioxane, diethylene glycol dimethyl ether and diethylene glycol diethyl ether;

acyclic and cyclic aliphatic and araliphatic ketones having up to 10 carbon atoms, e.g. acetone, methyl ethyl ketone, methyl propyl ketone, methyl butyl ketone, diethyl ketone, methyl isopropyl ketone, methyl isobutyl ketone, cyclopentanone, cyclohexanone, methylcyclohexanone, acetophenone, and propiophenone;

amides and $C_1$-$C_4$-alkylamides of aliphatic carboxylic acids having up to 4 carbon atoms, e.g. formamide, N,N-dimethyl- and N,N-diethylformamide, N,N-dimethyl- and N,N-diethylacetamide, N,N-dimethyl- and N,N-diethylpropionamide and N-methyl-pyrrolidone;

esters of aromatic carboxylic acids having a total of up to 12 carbon atoms, e.g. di-methyl phthalate and diethyl phthalate.

Preference is given here to the use of the solvents which can readily be removed during work-up, e.g. via extraction through washing with water, azeotropic distillation with water, steam distillation, or drying of the entire mixture.

Particularly preferred solvents are glycols and their mono- and dialkyl ethers.

If the aqueous crystallization medium comprises an organic solvent, the ratio by weight of water to organic solvent is usually from 99:1 to 50:50, in particular from 95:5 to 80:20.

The crystallization process can take place with dispersion of the crude pigment in the aqueous medium or else simply via standing. It is preferable that the mixture composed of crude pigment and aqueous medium is stirred.

Since the crystallization process is undertaken at temperatures in the boiling range of the aqueous medium or thereabove, it is advisable to use pressure-tight apparatus, e.g. pressure vessels, or to operate at reflux.

The inventive isoindoline pigments I can be isolated conventionally via filtration, washing, and drying. The dried product is advantageously subjected to de-agglomeration milling, e.g. in rotary mills, toothed-wheel mills or jet mills. As an alternative, the aqueous filtercake can also be freeze-dried or spray-dried.

If desired, it is also possible to use, in the inventive crystallization process, a crude pigment which has been subjected in advance to dry milling with a weakly basic milling aid. This can give inventive isoindoline pigments I with particularly narrow primary particle size distribution, these having somewhat redder hue.

Examples of suitable milling aids are water-soluble salts of weak inorganic acids, in particular alkali metal carbonates and alkali metal hydrogencarbonates, e.g. sodium carbonate, potassium carbonate, sodium hydrogencarbonate, and potassium hydrogencarbonate.

The ratio by weight of milling aid to crude pigment is generally from 10:1 to 1:1, preferably from 4:1 to 1:1.

Examples of suitable milling apparatuses are ball mills, vibratory mills, planetary-gear mills, and attritors. Examples of suitable milling media are steel shot, silicon/aluminum/zirconium oxide beads, glass beads, and agate beads, their diameter usually being from 0.1 to 5 cm.

It can be advantageous to carry out the milling process under an inert gas atmosphere in order to reduce risk.

It is preferable to mill the material until the average primary particle size of the milled material is $\leqq$50 nm, the time needed for this generally being from 1 to 40 h, in particular from 4 to 20 h.

The milled material is then mixed with water in order to remove the milling aid, isolated by filtration, washed, and isolated from the milling media. In the case of the milling process using steel shot, the milled material can be subjected to post-treatment with hydrochloric acid in order to remove any abraded iron material that may be present.

In order to control crystal size, it can be also be advantageous to carry out the crystallization process in the presence of pigment synergists, the amount of synergist used per g of crude pigment usually being from about 0.01 to 0.1 g. If a pre-comminution step is carried out, the pigment synergist can also be added before that step is complete.

Pigment synergists are compounds whose molecular structure comprises the pigment chromophor to some extent or entirely. The structure of the pigment synergists here does not have to be identical with the structure of the pigment whose crystallization is intended to be affected. For example, in the present case it is possible to use not only pigment synergists whose structure is based on the isoindoline structure but also, for example, those based on the quinophthalone structure.

Examples of particularly suitable pigment synergists are the quinophthalone derivatives known from WO-A-02/00643, preference being given to the pigment synergists derived from C.I. Pigment Yellow 138 and having one or more sulfonic acid functions on the naphthalene rings.

The presence of pigment synergists can also have a favorable effect on the dispersibility of the inventive isoindoline pigments I in the usage medium.

The dispersibility of the inventive isoindoline pigments I can moreover be improved via contact with conventional additives. Alongside aromatic sulfonic acid derivatives, such as naphthalene sulfonic acids and their salts, and additives based on colophonium derivates, additives based on natural and synthetic waxes are particularly suitable for coloring of plastics. By way of example, mention may be made of waxes based on polyethylene and on polypropylene, which may also have been oxidized, on polyethylene oxide, on ethoxylated fatty alcohols, on polyethylene oxide-polypropylene oxide block copolymers, on fatty acid esters (e.g. montan waxes), on fatty acid amides, and on ethylene-vinyl acetate copolymers.

If additives of these types are used, their amount is usually from 2 to 30% by weight, based on the pigment.

The inventive isoindoline pigments I have excellent suitability for the coloring of high-molecular-weight organic materials of natural and synthetic origin.

Examples that may be mentioned of materials of those types are plastics, powder coatings, inks, toners, and color filters.

The inventive isoindoline pigments I are particularly important for the coloring of plastics.

Specific examples of plastics to be colored with advantage are:

polyolefins, such as polyethylene, polypropylene, polybutylene, polyisobutylene, and poly-4-methyl-1-pentene, polyolefin copolymers, such as Luflexen® (Basell), Nordel® (Dow), and Engage® (DuPont), cycloolefin copolymers, such as Topas® (Celanese); polytetrafluoroethylene (PTFE), ethylene-tetrafluoroethylene copolymers (ETFE); poly-vinylidene difluoride (PVDF), polyvinyl chloride (PVC), polyvinylidene chloride, polyvinyl alcohols, polyvinyl esters, such as polyvinyl acetate, vinyl ester copolymers, such as ethylene-vinyl acetate copolymers (EVA), polyvinyl alkanals, such as polyvinyl acetal and polyvinyl butyral (PVB), polyvinyl ketals, polyamides, such as Nylon® [6], Nylon [12], and Nylon [6,6] (DuPont), polyimides, polycarbonate, polycarbonate copolymers, and physical blends of polycarbonates with acrylic-butadiene-styrene copolymers, with acrylonitrile-styrene-acrylate copolymers, with polymethyl methacrylates, with polybutyl acrylates, with polybutyl methacrylates, with polybutylene terephthalates, and with poly-ethylene terephthalates; other examples are polyesters, such as polyethylene terephthalate (PET), polybutylene terephthalate (PBT), and polyethylene naphthalate (PEN), copolymers, transesterification products and physical mixtures (blends) of the abovementioned polyalkylene terephthalates, poly(meth)acrylates, polyacrylamides, polyacrylonitrile, poly(meth)acrylate/polyvinylidene difluoride blends, polyurethanes, polystyrene, styrene copolymers such as styrene-butadiene copolymers, styrene-acrylonitrile copolymers (SAN), styrene-ethyl methacrylate copolymers, styrene-butadiene-ethyl acrylate copolymers styrene-acrylonitrile/methacrylate copolymers, acrylonitrile-butadiene-styrene copolymers (ABS), and methacrylate-butadiene-styrene copolymers (MBS), polyethers such as polyphenylene oxide, polyether ketones, poly-sulfones, polyether sulfones, polyglycols such as polyoxymethylene (POM), polyaryle-nevinylenes, silicones, ionomers, thermoplastic and thermoset polyurethanes, and also mixtures of these, emphasis being placed on polyolefins, especially polyethylene (LDPE, MDPE, HDPE), and polyvinyl chloride.

Any of the known methods can be used to incorporate the inventive isoindoline pigments I into the plastics, examples being extrusion of the materials together (preferably using a single- or twin-screw extruder), rolling, kneading, compression or milling, where the plastics can be processed to give plastics moldings, or to give continuous profiles, or to give sheets, foils, fibers, films, and coatings.

It is likewise advantageous to use pigment preparations separately prepared in advance and based on a polymer, or on a polymer blend, or on one or more polyolefin waxes, or on mixtures of these, to give homogeneous colorings with good color strength in low-melting-point polymers (e.g. most familiar polyolefins) or in those having low melt viscosity (e.g. plasticized PVC and PVB, and also blow-moldable PET). Whereas the carrier polymer (blend) used in polymer-based pigment preparations ("master-batch", "compounded material") is generally identical with the high-molecular-weight synthetic organic material to be colored, carrier materials particularly used for the preparation of polyolefin-wax-based pigment preparations are homo- and copolymeric PE waxes and homo- and copolymeric PP waxes, e.g. Luwax® A (ethylene homopolymer; BASF), Luwax EVA (ethylene-vinyl acetate copolymer; BASF) and Licowax® PP 230 (propylene homopolymer; Clariant).

EXAMPLES

A. Preparation of Inventive Isoindoline Pigments I

Example 1

100 g of a compressed cake of C.I. Pigment Yellow 185 (solids content about 50% by weight; prepared according to Example 1 of DE-A-29 14 086) moist with water were homogeneously suspended in 1125 ml of water over a period of 1 h. The suspension was then heated to 115° C. within a period of 2 h in a 2.4 l pressure vessel (Juchheim) with anchor stirrer (rotation rate 150 rpm) and stirred at this temperature for 12 h.

After cooling to 60° C. over a period of 1 h, the pigment was isolated by filtration and washed with 5 l of water which had been heated to 60° C. (conductivity of discharge water <100 µS). The moist compressed cake was dried at 70° C. in a drying cabinet with air circulation and, for de-agglomeration, milled in a toothed-wheel mill (ZM 100 ultracentrifugal mill, Retsch; toothed wheel class: 12, 1.0 mm sieve, 10 000 rpm). The yield was 100%.

Example 2

After addition of 100 g of ethylene glycol monobutyl ether, 570 g of a synthesis suspension of C.I. Pigment Yellow 185 (pigment content: 5.4% by weight) obtained according to Example 1 of DE-A-29 14 086 were heated, with stirring, to 100° C. (reflux temperature and stirred at this temperature for 12 h.

The granular material formed after cooling for one hour to 70° C. was isolated by filtration and washed with 5 l of water heated to 60° C. (conductivity of water discharged <50 µS). The moist compressed cake was dried at 120° C. in a drying cabinet with air circulation and, for de-agglomeration, milled as in Example 1. The yield was 90%.

Example 3

570 g of a synthesis suspension of C.I. Pigment Yellow 185 (pigment content: 5.4% by weight) obtained according to Example 1 of DE-A-29 14 086 were heated to 130° C. within a period of 2 h in a 2.4 l pressure vessel (Juchheim) with anchor stirrer (rotation rate 150 rpm) and stirred at this temperature for 3 h.

After cooling to 60° C. over a period of 1 h, the pigment was isolated by filtration and washed with 5 l of water which had been heated to 60° C. (conductivity of discharge water <50 µS). The moist compressed cake was dried at 70° C. in a drying cabinet with air circulation and, for de-agglomeration, milled as in Example 1. The yield was 100%.

Example 4

600 g of a synthesis suspension of C.I. Pigment Yellow 185 (pigment content: 5.1% by weight) obtained according to Example 1 of DE-A-29 14 086 were heated to 95° C. within a period of 2 h in a 1 l glass reactor (Normag) with anchor stirrer (rotation rate 150 rpm) and stirred at this temperature for 36 h.

After cooling to 60° C. over a period of 1 h, the pigment was isolated by filtration and washed with 5 l of water which had been heated to 60° C. (conductivity of discharge water <50 µS). The moist compressed cake was dried at 70° C. in a drying cabinet with air circulation and, for de-agglomeration, milled as in Example 1. The yield was 100%.

B. Testing of Inventive Pigments in Plastics

The pigments obtained were incorporated into polyethylene (LDPE) and flexible PVC for testing their performance characteristics.

Color properties and ease of dispersion were determined on milled sheets produced as follows in each case using a (1:10) white reduction:

LDPE Milled Sheet:

80 g of white colored LDPE pellets (Sicolen® white 00/24729 pellets with 5% by weight of titanium dioxide) and 0.4 g of the respective pigment were weighed out separately and further processed as follows on a Collin mixing rolls:

The white colored LDPE pellets were used as initial charge at 150° C. (±2° C.) roll temperature. Once a milled sheet had been formed, the pigment was added in portions and processed to give a milled sheet of thickness 0.4 mm (±10%) at a roll temperature of 150° C. (±2° C.) using 250 roll revolutions. After cutting to remove about 10 g (milled sheet 1), the remaining milled sheet was halved and, once the two halves had been mutually superposed, the material was milled for a further 220 roll revolutions at 150° C. (±2° C.) (milled sheet 2).

PVC Milled Sheet:

80 g of white colored PVC parent mixture to DIN 53775-B (48.7 g of vinyl chloride homopolymer, 25.1 g of diisodecyl phthalate, 1.12 g of epoxidized soyoil, 0.97 g of stabilizer, 0.15 g of stearic acid, and 4.0 g of titanium dioxide) and 0.4 g of the respective pigment were homogenized in a Turbula® mixer.

The resulting mixture was processed to give a milled sheet of thickness 0.4 mm (+10%) on a Collin roll mill at 150° C. (±2° C.) roll temperature using 165 roll revolutions. After about 10 g had been cut away (milled sheet 1), the remaining milled sheet was halved and, once the two halves had been mutually superposed, the material was milled for a further 225 roll revolutions at 150° C. (±2° C.) (milled sheet 2).

The color of the specimens (milled sheet 2) was measured to DIN 5033 (0/0° measurement geometry) using a Teleflash (Optronik) spectrophotometer.

The reduction ratio RR was determined to DIN 53235-1 by using the FIAF method to match the depth of shade of the specimen to be tested to ⅓ of standard depth of shade. The CIELAB chromaticity coordinates in the table for Hue [°], Chroma C*, lightness L*, a* (red and, respectively, green component), and b* (blue and, respectively, yellow component) were determined after matching of the depth of shade to DIN 6174 (D65 standard illuminant, 10° standard observer).

The values (DH) expressing ease of dispersion were calculated by the formula below from the respective reduction ratios obtained in the test:

$$DH = \left[\frac{RR2}{RR1} - 1\right] \times 100$$

where:
RR 1=reduction ratio for milled sheet 1
RR 2=reduction ratio for milled sheet 2

The test results obtained (CIELAB chromaticity coordinates and values expressing ease of dispersion) are collated in the table below. For comparison comp. here, the test results obtained in LDPE in Example 14 of EP-A-29 007 have also been listed.

TABLE

| Pigment (Ex.) | Hue [°] | C* | L* | a* | b* | RR2 | DH |
|---|---|---|---|---|---|---|---|
| LDPE | | | | | | | |
| 1 | 92.2 | 74.1 | 87.5 | −3.8 | 73.8 | 6.7 | 2 |
| 2 | 91.8 | 73.3 | 86.8 | −3.3 | 73.2 | 5.4 | 6 |
| 3 | 91.8 | 72.9 | 87.0 | −3.3 | 72.8 | 5.3 | 4 |

TABLE-continued

| Pigment (Ex.) | Hue [°] | C* | L* | a* | b* | RR2 | DH |
|---|---|---|---|---|---|---|---|
| 4 | 91.1 | 73.0 | 86.7 | −3.3 | 74.0 | 5.2 | 2 |
| Comp. | 84.4 | 56.3 | 73.6 | 5.0 | 56.1 | 2.1 | 4 |
| Flexible PVC | | | | | | | |
| 4 | 91.0 | 74.3 | 87.4 | 2.5 | 74.3 | 11.7 | 6 |

The invention claimed is:

1. An isoindoline pigment of the general formula I

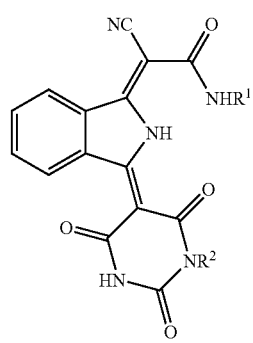

in which the variables are defined as follows:
$R^1$ is $C_1$-$C_4$-alkyl;
$R^2$ is hydrogen or $C_1$-$C_4$-alkyl,
whose value expressing ease of dispersion in LDPE is 10 and which require a reduction ratio of ≧5 to obtain ⅓ of standard depth of shade.

2. The isoindoline pigment of formula I according to claim 1, in which $R^1$ is methyl and $R^2$ is hydrogen.

3. A process for the preparation of isoindoline pigments according to claim 1, which comprises subjecting the crude pigment produced during pigment synthesis to heat treatment for from 1 to 60 hours at a temperature T in the range from 90 to 180° C. in aqueous suspension, to which organic solvents from the group of alcohols, ether alcohols, ethers, ketones, carboxamides, and carboxylic esters may have been added, and then isolating the material conventionally, where the temperature T [° C.] is to be calculated from the treatment time t [h] by the following formula using the selected treatment time:

$T[° C.]=[148-14.4 \ln(t)]±10$.

4. The process according to claim 3, wherein the suspension produced during aqueous pigment synthesis is subjected to the heat treatment.

5. A process for making colored plastics, comprising:
incorporating the isoindoline pigments of the formula I according to claim 1 into high-molecular-weight organic materials of natural and synthetic origin.

6. The process according to claim 5, wherein the high-molecular-weight materials are plastics, powder coatings, inks, toners, and color filters.

7. The process according to claim 5, wherein the high-molecular-weight materials are plastics.

8. A plastic, colored with isoindoline pigments according to claim 1.

9. The process according to claim 3, wherein the organic solvents have been added.

* * * * *